(12) United States Patent
Johnson

(10) Patent No.: US 8,271,412 B2
(45) Date of Patent: Sep. 18, 2012

(54) METHODS AND SYSTEMS FOR DETERMINING ENTROPY METRICS FOR NETWORKS

(75) Inventor: Joseph E. Johnson, Winnsboro, SC (US)

(73) Assignee: University of South Carolina, Columbia, SC (US)

( * ) Notice: Subject to any disclaimer, the term of this patent is extended or adjusted under 35 U.S.C. 154(b) by 925 days.

(21) Appl. No.: 12/158,424

(22) PCT Filed: Dec. 20, 2006

(86) PCT No.: PCT/US2006/062375
§ 371 (c)(1),
(2), (4) Date: Oct. 7, 2008

(87) PCT Pub. No.: WO2008/051258
PCT Pub. Date: May 2, 2008

(65) Prior Publication Data
US 2009/0024549 A1    Jan. 22, 2009

Related U.S. Application Data

(60) Provisional application No. 60/752,444, filed on Dec. 21, 2005, provisional application No. 60/815,739, filed on Jun. 21, 2006.

(51) Int. Cl.
*G06F 17/00* (2006.01)
*G06N 5/02* (2006.01)

(52) U.S. Cl. ........................................................ 706/46
(58) Field of Classification Search ........................ None
See application file for complete search history.

(56) References Cited

U.S. PATENT DOCUMENTS

| 5,602,964 A | 2/1997 | Barrett |
| 5,727,051 A | 3/1998 | Holender |
| 2003/0147400 A1 | 8/2003 | Devi |

OTHER PUBLICATIONS

Gu et al. "Detecting Anomalies in Network Traffic Using Maximum Entropy Estimation", IMC, 2005, pp. 345-350.*
Wagner et al. "Entropy Based Worm and Anomaly Detection in Fast IP Networks", 14th IEEE WET ICE / STCA security, 2005, pp. 172-177, pages: 6.*
Johnson, J.E., "Networks, Markov Lie Monoids, and Generalized Entropy," Conference Presentation, St. Petersburg, Russia, Mar. 28, 2005.
Johnson, J.E., "Markov-type Lie Groups in GL(n,R)," J. Math. Phys. 26(2):252-257 (1985).

* cited by examiner

*Primary Examiner* — Alan Chen
*Assistant Examiner* — Li-Wu Chang
(74) *Attorney, Agent, or Firm* — Ballard Spahr LLP

(57) ABSTRACT

Methods and systems for network monitoring using network metrics which are generalized entropy functions of the Markov monoid matrix M generated by an altered connection matrix C.

7 Claims, 9 Drawing Sheets

METHODS AND SYSTEMS FOR DETERMINING ENTROPY METRICS FOR NETWORKS

CROSS REFERENCE TO RELATED PATENT APPLICATIONS

This application claims priority to U.S. Provisional Application No. 60/752,444 filed Dec. 21, 2005 and U.S. Provisional Application No. 60/815,739 filed Jun. 21, 2006, both of which are herein incorporated by reference in their entireties.

FEDERAL GOVERNMENT SUPPORT CLAUSE

The present invention was developed with Government funds provided by the Defense Advanced Research Projects Agency (DARPA) under project number FA8750-40-2-0260. The Government has certain rights in this invention.

BACKGROUND

A vast spectrum of modern problems center on understanding the status and dynamical behavior of networks. For example, our entire national and world economic system of financial transfers, shipments of goods, transportation of people, delivery of utilities, and the contagion of disease can only be managed and understood if we are able to understand the behavior of networks. One of the most daunting of these problems is the emergence of the internet for computer and personal communication including the remote control of devices by internet, by software or persons from a distant site often without our knowledge or understanding. Foremost among these problems are the emergence of computer bugs, worms, viruses, attacks, and an entire spectrum of malicious processes requiring something akin to the biological defenses necessary for the maintenance of life forms. All of these systems can be described as set of nodes where some nodes are connected by a weight of connection that can be zero or a positive number and thus constitute a network.

Another type of network that can reek havoc on modern society are networks of both criminal and terrorist groups. If we cannot maintain secure communication and control for our military complex then we become subject to attacks and destruction of our social order to an extent never before conceivable. Thus the problem of understanding, monitoring, tracking, and securing networks is of the greatest possible importance to the security of our nation, world order, and the very survival of advanced civilization.

The problem of understanding networks is thus of the greatest possible importance for the future stability of a complex social system. The central network problem resides in the shear volume of data and the fact that any one value can be of the same importance as every other value. What are needed are systems and methods for determining and utilizing summary statistical data to understand, monitor, and analyze the status and dynamical behavior of networks networks.

SUMMARY OF THE INVENTION

Provided are network metrics which are generalized entropy functions of the Markov monoid matrix M generated by an altered connection matrix C. When sorted, the associated entropy spectra for the columns and rows of C monitor the state and time evolution of the incoming and outgoing entropy at network nodes. These well defined functions satisfy criteria of being fast to compute (compared to eigenvalues), intuitive in interpretation, and hierarchical in revealing sequentially detained network information. They can be used to dynamically monitor networks relative to such normal metrical values thus identifying when the network statistically alters its intrinsic patterns of connectivity.

Additional advantages of the invention will be set forth in part in the description which follows or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION OF THE INVENTION

Figure 1:
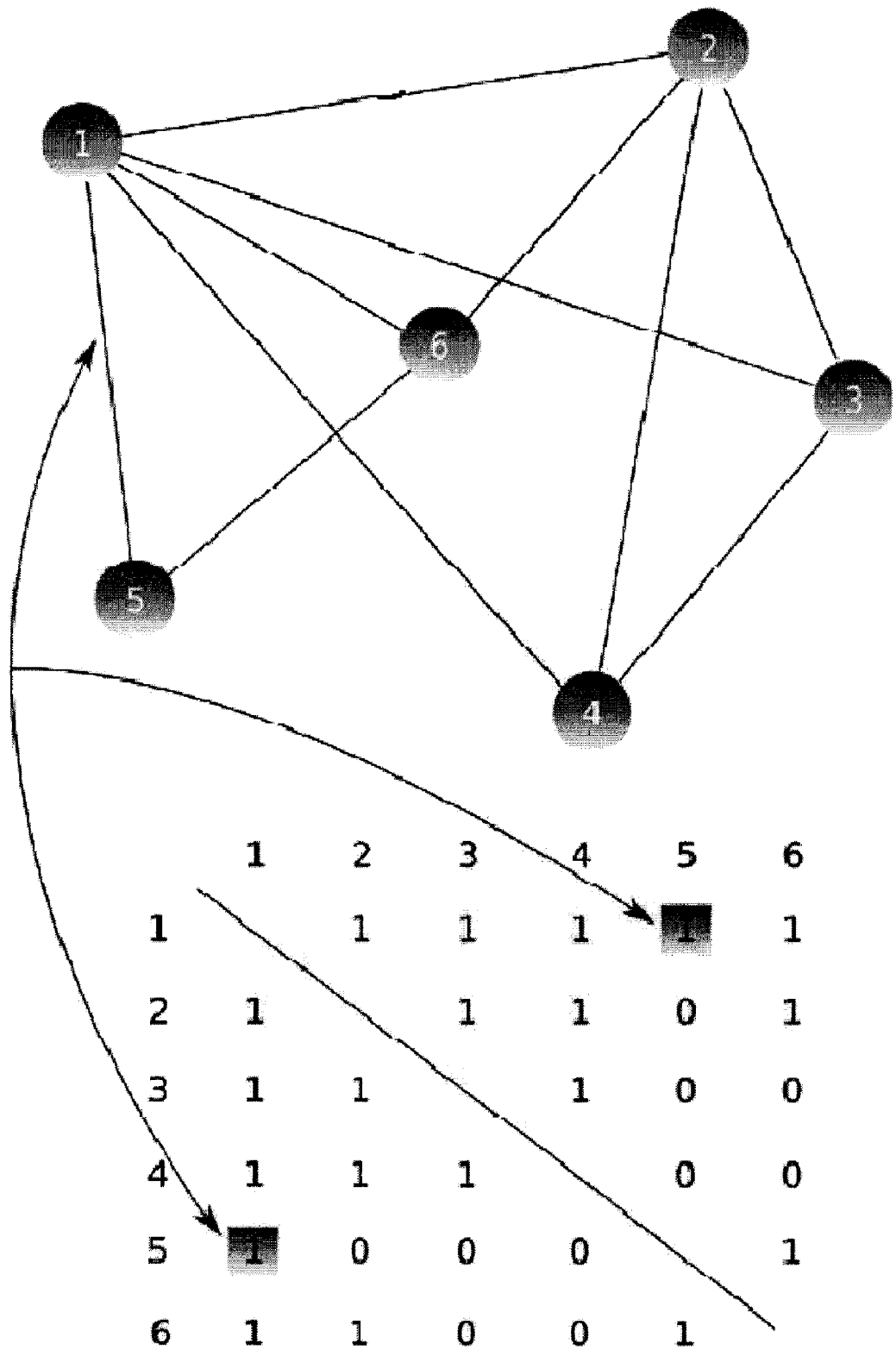
FIG. 1 is an exemplary network with a corresponding connection matrix.

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present invention may be understood more readily by reference to the following detailed description of preferred embodiments of the invention and the Examples included therein and to the Figures and their previous and following description.

I. Introduction

A network of N nodes can be exactly described by a matrix of $N^2-N$ non-negative off-diagonal values representing the connection weights among the N nodes. When a network is large and changing every second such as the Internet, then the resulting system has tens of millions of values every second. Provided is a method for reducing this vast data into a few (2N and fewer) representative values (network entropy spectral functions, or metrics) in order to track the changing topology for attacks, failures and malicious processes.

The general linear group of transformations that are continuously connected to the identity in n dimensions GL(n, R), can be decomposed into two Lie groups: (1) an n(n−1)-dimensional Markov-type Lie group M(n) that is defined by preserving the sum of the components of a vector, and (2) the n-dimensional Abelian Lie group, A(n), of scaling transformations of the coordinates. With the restriction of the Markov-type Lie algebra parameters to non-negative values, exactly all Markov transformations in n dimensions can be obtained that are continuously connected to the identity. More precisely, this system is now a Markov Monoid (MM) as it is a group without an inverse.

Every network, as defined by its connection matrix $C_{ij}$, is in one to one correspondence to a single element of the MM Lie algebra of the same dimensionality. It follows that any network matrix, C, is the generator of a continuous Markov transformation that can be interpreted as producing an irreversible flow of a conserved substance among the nodes of the corresponding network. The exponentiation of the MM algebra provides a continuous transformation with rows and columns that constitute normed probability distributions that encapsulate the topology of the network in all orders of expansion. This allows Shannon and generalized (Renyi) entropy functions to be defined on the column and row probability distributions. These (2N) generalized entropies (along with derivatives and functions of these entropies) for these Markov transformations become metrics for the topology of the corresponding network encapsulating all of the network topology in a more hierarchical way. Thus the fields of Lie groups and algebras, Markov transformations, conserved flows, diffusion transformations, and generalized entropies, are tightly connected on the one hand, to network theory and network topology. Provided are methods applying these generalized entropies as metrics for the tracking of network topological changes such as would be expected under attacks and intrusions on internets.

There is a broad spectrum of mathematical problems that involve the general theory of networks and the associated classification, optimization, and potentially even their dynamical evolution. By a network is meant a set of n nodes (points), some pairs of which are connected with a representative non-negative weight or strength of connection. Such a network can be represented by a connection (or connectivity, or adjancy) matrix $C_{ij}$ whose off-diagonal elements give the non-negative 'strength' of the connection between nodes i and j in the network. Often that 'strength' or 'weight' is as simple as a '1' for a connection and a '0' otherwise. An example of a network and a corresponding matrix is shown in FIG. 1. A network can be 'undirected' or 'directed' depending upon whether $C_{ij}$ is symmetric or not thus indicating respectively a symmetric or asymmetrical connection between i and j. There may or may not exist a 'metric distance' between the nodes or, equivalently, positions for the points in a metric space of some dimensionality, such as airports for airline networks, or substations for power or utility distribution networks. The classification of different network topologies cannot be accomplished with just the eigenvalue spectra of the connectivity matrix as there are topologically different networks with as few as five nodes that have the same eigenvalue spectra. One root of the network problem is that although the network is exactly defined by the C matrix, there are n! different C matrices that correspond to the same topology because different C matrices result from different nodal numbering orders. Most network problems become computationally intractable for more than a few hundred nodes. The essential point here is that the n(n−1) off-diagonal non-negative values of C uniquely define a network. The n column values are arbitrary at this point and are undefined.

Provided are useful metrics (functions of the C matrix) for the description of the topology of large networks such as sub-nets of the internet which might have from a hundred to a million nodes, and thus perhaps a trillion connection matrix values. The metrics can (a) be rapidly computable (as compared to eigenvalue computations), (b) be intuitively meaningful, (c) holistically summarize the underlying topology with a few variables, (d) offer meaningful hierarchical expansions providing increasing levels of topological detail and (e) be invariant under the permutation group on node numbering and thus reflect the intrinsic topology. Of initial interest are information flows of which originating node sends data to which destination node; rather than the underlying physical connectivity topology itself, the specific path which the information traverses, and the associated distance metrics of this type. Internet transmissions are extremely dynamic and thus to achieve some form of continuity, a C matrix can be constructed using a summation of information transfers, or weights, over some time window t−δ/2 to t+δ/2, surrounding a time t as C(t,δ) thus representing the time evolution of the connection matrix. The parameter δ can be the time increment (window) where transactions are added together between a time of t−δ/2 and t+δ/2. For example, the connection matrix C(t, δ)=C(9:30, 1 hr) is the sum of all network transactions between a time of t−δ/2 and t+δ/2. It can be, for example, all banking transactions between nodes during the period from 9 am and 10 am thus making δ=1 hour.

Given the number of connections, this problem resembles the representation of a physical gas in terms of thermodynamical variables (such as temperature, volume, pressure, heat, and entropy). Generally, in such internet environments there is no meaningful location or position metric that gives insight into the topology and thus distance is not usefully defined. As such pressure and volume, do not have a clear meaning without a distance function. There is no general conserved quantity such as energy, and thus heat and temperature do not offer clear meanings. However, entropy can be well defined and used to summarize the order and disorder in the underlying topological structure.

Initially, how to define entropy on the connection matrix is not clear since both Shannon and Renyi entropies are defined as the log of the sum of the powers of the components of a vector, $x_i$, representing probabilities: $S=c \log_2(b(\Sigma x_i^a))$ where $\Sigma x_i=1$ and where a, b, and c are constants. As such these entropies represent the disorder in the underlying probability distribution. The disorder is a maximum with an even probability distribution and is a minimum when all the probability is in one cell with others having a value of zero. But the connection matrix columns or rows cannot be used as probability distributions since the diagonal of C is totally arbitrary. Even if some arbitrary choice of the diagonal values of C is made and the columns normalized, it is not clear what underlying topological 'disorder' is measured. Any set of non-negative numbers can be normalized to unity and the entropy of the distribution computed. But without an underlying mathematical and intuitive foundation for the meaning of this distribution it would follow that the resulting entropy calculation is likewise ambiguous. Provided are methods utilizing the decomposition of the general linear group in order to gain insight into how to define these entropy metrics in useful ways described above.

Also provided are methods that can utilize definitions of entropy (or equivalently information as negative entropy). The original argument by Shannon was that if the information of two independent systems is to be additive, and if the information is a function of the probability distribution, and since probabilities of independent systems is multiplicative, then it follows that information (or entropy) must be the log of a power of the probability. More precisely beginning with Shannon it can be shown that $I=-\log_2(P)$ so that the probability P of a simple two state system ('1' or '0') is ½ for each thus giving I=1 bit of information. More generally with the work of Kolmogorov and Renyi' a probability distribution $x_i$ among n cells (i=1,2, . . . n) with $\Sigma x_i=1$ can be considered as $I=a \log_2(n \Sigma x_i^b)$. As described below, any of the generalized Renyi' entropies can be used but by way of example, a=1 and b=2 are used giving $I=\log_2(n \Sigma x_i^2)$. This can be shown to smoothly generalize the Shannon entropy as a boundary condition for two states. For example when $x_1=1$ and $x_0=0$ (or conversely) then n=2 and I=1 for maximum information of one bit thus agreeing with Shannon. Then when there is equal probability and thus no information, $x_1=x_0=½$ thus I=0. When a probability distribution is flat, the information function above becomes a minimum but when it peaks then the square of the probability becomes much larger and the information increases as the log of the sum of the squares of the values. In the following, information and entropy is used interchangeably as one is the negative of the other.

II. Background on Markov Lie Groups and Monoids

The transformations in the general linear group in n dimensions, that are continuously connected to the identity, can be decomposed into two Lie groups: (1) an n(n−1) dimensional 'Markov type' Lie group that is defined by preserving the sum of the components of a vector, and (2) the n dimensional Abelian Lie group, A(n), of scaling transformations of the coordinates. To construct the Markov type Lie group, consider the k, l matrix element of a matrix $L^{ij}$ as a basis for n x n matrices, with off-diagonal elements, as $L^{ij}{}_{kl}=\delta^i_k\delta^j_l-\delta^j_k\delta^j_l$ with i≠j. Thus the ij basis matrix has a '1' in position ij with a '−1' in position jj on the diagonal. These n(n−1) matrices form a basis for the Lie algebra of all transformations that preserve the sum of the components of vector. With this particular choice of basis, it can then be shown that by restricting the parameter space to non-negative real values, $\lambda^{ij}>=0$, exactly all Markov transformations can be obtained in n dimensions that were continuously connected to the identity as M=exp (s $\lambda^{ij}L^{ij}$) where it is summarized over repeated indices and where s is a real parameter separated from $\lambda^{ij}$ to parameterize the continuous evolution of the transformation. In other words $\lambda^{ij} L^{ij}$ consists of non-negative coefficients in a linear combination of $L^{ij}$ matrices. This non-negativity restriction on the parameter space removes the group inverses and results in a continuous Markov monoid, MM(n), a group without an inverse, in n dimensions. The basis elements for the MM algebra is a complete basis for n×n matrices that are defined by their off-diagonal terms.

The n dimensional Abelian scaling Lie algebra can be defined by $L^{ii}{}_{kl}=\delta^i_k \delta^i_l$ thus consisting of a '1' on the i, i diagonal position. When exponentiated, A(s)=exp (s $\lambda^{ii}L^{ii}$), this simply multiplies that coordinate by $e^s$ giving a scaling transformation.

III. Connecting Markov Monoids to Network Metrics

The observations are made that (1) since the non-negative off diagonal elements of an n x n matrix exactly define a network (via C) and its topology with that node numbering, and (2) since a Markov monoid basis is complete in spanning all off-diagonal n×n matrices, then it follows that such networks are in one to one correspondence with the elements of the Markov monoids. The Lie Markov matrix that results is exactly the C matrix where the diagonal elements are set equal to the negative of the sum of all other elements in that column. Thus each such altered connection matrix is the infinitesimal generator of a continuous Markov transformation and conversely. This observation connects networks and their topology with the Lie groups and algebras and Markov transformations in a unique way. Since the Markov generators must have the diagonal elements set to the negative of the sum of the other elements in that column, this requirement fixes the otherwise arbitrary diagonal of the connection matrix to that value also (sometimes referred to as the Lagrangian)

It follows that this diagonal setting of C generates a Markov transformation by $M=e^{\lambda C}$. The action of a Markov matrix on a vector of probabilities (an n-dimensional set of non-negative real values whose sum is unity), will map that vector again into such a vector (non-negative values with unit sum). The next observation is that by taking λ as infinitesimal, then M=I+λC by ignoring higher order infinitesimals. The value or weight of the connection matrix between two nodes gives the M matrix element as the relative infinitesimal transition rate between those two components of the vector. Thus it follows that given a probability distribution $x_i$ distributed over the n nodes of a network, then M gives the Markov transition (flow) rates of each probability from one node to another. Thus it also follows that the connection matrix gives the infinitesimal transition rates between nodes with the weight reflecting that exact topology.

Specifically, if the hypothetical initial probability vector is $x_i=(1, 0, 0, 0 \ldots 0)$ then the vector at a time dt later will be equal to the first column of the M matrix, M=I+dt C. Thus the first column of M is the probability distribution after an infinitesimal time of that part of the probability that began on node 1 and likewise for all other nodes thus giving a probability interpretation to each of the columns of M as the transfer to that node. Thus each column of M can be treated as a probability distribution associated with the topology connected to that associated node and will support an unambiguous definition of an associated entropy function that reflects the inherent disorder (or order) of a flow during time (dt). Thus the columns of M support a meaningful definition of Renyi entropies which in turn reflect the Markov transformation towards disorder of the topological flow to the node for that column. Thus this Renyi entropy on this column can be said to summarize the disorder of the topology of the connections to that node to that order of the expansion. It follows that the spectra of all nodes reflects in some sense the disorder of the entire network. The numbering of the nodes is arbitrary and thus the nodes can be renumbered without affecting the underlying topology Thus the N values of the nodal entropy are sorted in descending order which gives a spectral curve independent of nodal ordering and thus independent of the permutations on nodal numbering (except possibly for some degeneracy which is addressed below). That spectral curve can be summarized by the total value for the entropy of all columns (since entropy is additive and the column values are totally independent).

If the connection matrix is symmetric then the graph (network) is said to be undirected, but if there is some asymmetry, then the graph is at least partially directed where the flow from i to j is less or greater than the converse flow. If the connection matrix is not symmetrized then this asymmetry can be captured by resetting the diagonal values of C to be equal to the negative of all other row values in that row. Then upon expansion of M=I+λC, the rows can be automatically normalized probabilities that in turn support entropy functions for each row. These row entropy values form a spectrum which could be sorted by the same nodal values (in order) that is used to order the column values. This will result in a different spectral curve that is not necessarily in non-decreasing order for the row entropies.

The total row entropy can be computed as was done for columns. If two columns have the same entropy then some of the numbering degeneracy can be removed by using the values of the associated row entropies to rank order the degenerate node order of column values.

IV. Practical and Computational Considerations

The methods provided have practical aspects pertaining to applications to real networks. (If there is a single C matrix and time is not involved then the following discussion on time windows does not apply.) An exemplary data flow with records can have fields that include: (a) network type, (b) time, (c) node i, (d) node j, (e) weight. These might be, for example, captures of internet traffic between IP addresses, financial transitions between bank accounts, power transfers among electrical grid substations, passengers flown between two airports, etc. Such captures can be made via a network monitoring application, by way of example and not limitation, SNORT (as available from http://www.snort.org). The $C(t, \delta)$ matrix is constructed by summing the weights into the appropriate cells (renumbered with integers as i,j=1, 2, ... N) during a time period $\delta$ centered about time t. A period $\delta$ allows a 'representative' accumulation of values for the disagrigation size N. If C is too sparse, then longer time windows are chosen or the matrix nodes are collapsed by some natural methodology such as IP sectors, or flights between states and not airports. In some cases it may be desirable to combine several network types using a linear combination of the contributions determined by the first parameter. In some considerations, it may be desireable to modify the weight of the contribution such as using the log of the financial transfer. In one aspect, the methods provided comprise loaders with such adjustable parameters. The result of this process is a C(t) with no diagonal terms. This can then be put in the form of a Lie Monoid generator by setting the diagonal terms equal to the negative of the other terms in that column (and later row). It can then be useful to normalize the entire matrix to have a fixed trace of −1 or −N as this can allow better control over the subsequent expansion into the Markov matrix. The value of this trace is stored for later use.

The expansion $M(t)=e^{\lambda \cdot C(t)}$ although mathematically guaranteed to converge, have non-negative terms and generally be Markovian, must be executed with a small number of terms if C is large. The parameter $\lambda$ gives a weighting of the higher terms in the expansion where it might be chosen to sum up through 'k' terms. The number of such terms is the extent to which M 'feels out' the connections to the connections etc. as weighted by the parameter $\lambda$. These two must work hand in hand since it is meaningless to have a very large $\lambda$ while only expanding to the first order in C. Conversely, it is meaningless to expand to many powers, k, of C while using a nearly infinitesimal value of $\lambda$ since higher orders of $\lambda$ will make such higher powers of C vanish. The next consideration is that although the M matrix has only positive terms when the full expansion is executed, in practice a k and $\lambda$ can be chosen which, due to the negative diagonals of C, can give negative terms for truncated expansions. Thus the methods provided can utilize error checks to make the appropriate corrections in the expansion.

Now having the M(t) matrix for that instant, $E_j^c = \log_2(N (\Sigma_i M_{ij}^2))$ (i.e., the log of the sums of squares of each column) is computed to get the entropy (information) for that column representing the transfers into that node by the Markov matrix. The spectra can be computed by sorting these by value while keeping a lookup table for which node goes to which original position. A similar computation can be done to compute the entropies of the rows $E_j^r$ where the same sort order is used except for removing potential degeneracies (where the column values are the same and thus not distinguished by order). These two spectral curves, or histograms, can be computed for each successive time window and overlaid graphically to compare the row and column entropy profiles over time. A critical point is to realize that it does not matter that the nodes are renumbered with each window, but rather the methods are interested in whether the profile of order and disorder of the underlying topology is 'about the same'. Naturally some profiles for networks change, for example, from late Sunday night to rush hours at 9 AM Monday. Likewise, power grids depend upon the temperature as well as the time of day. Thus for a given time of day, day of week, and if necessary for that network, weather pattern and temperature, the profile of what is normal (and also profile one standard deviation) is learned for the network under consideration. The instantaneous network spectra is overlayed over the normal profile and graphically displayed. Additionally, the variance between the normal profile and the instantaneous network spectra can be determined and the variance displayed. All of the row entropies can be summed into a single value Er(t) and likewise for the columns. Then, the squares of deviations from normal can be summed to obtain a single value representing the total deviation of column entropies from normal (and likewise for the rows). In one aspect, the methods provided can perform these computations and displays along with the overall network 'amplitude' which is the trace of the original C matrix. This provides three curves that can be monitored over time as well as watching the current row and column entropy spectra displayed overlaid upon the normal distribution for those circumstances. The location where anomalies are occurring in the network can be identified for example by clicking on the associated spectral curve anomaly area. The system can then find the node identification in the lookup table thus identifying the anomalous nodes and subnets.

As described earlier, the flows that are modeled by $M(t) = e^{\lambda \cdot C}$ have nothing at all to do with the dynamical evolution of the network. These metrics can be used to monitor the network state and dynamical behavior but not to predict it. Rather the evolution generated by $M(\lambda)$ is a dynamical flow that would occur if a conserved fluid (probability, money, population . . . ) were to move among the nodes at the rates indicated by the C matrix of connected weights. Thus the value of $M(\lambda)$ is that the associated entropies can be used to summarize the order or disorder of the incoming or outgoing topological connectivity of the (static) network at one given instant of time. The entropy values can capture the most essential aspects of the structure of the column and row probability distributions, and thus the topology, to that level of expansion of the parameter $\lambda$. By expanding to higher powers of C, with larger values of $\lambda$, the entropy metrics capture increasing levels of the connections to the connections etc. Also by utilizing other Renyi' entropies, other spectra and values that measure other 'moments' of the probability distributions can be obtained.

Alternative diagonal values' of the C matrix can also be considered by adding the Abelian scaling group transformation generators to the diagonal values of C. These transformations destroy the conservation of the modeled flow (such as probability) and thus the resulting transformation is no longer Markovian. These altered diagonal transformations are equivalent to adding sources and sinks of the modeled fluid at the associated nodes. It is straight forward to prove that the entropy value $E(t)=\log_2(N<x(t)|x(t)>)$ when taken to only the third level of expansion, can, with its partial derivatives with respect to such sources and sinks at the node 'j', for different initial conditions for the flow $|x(0)>$ at node 'i', formally obtain the entire C matrix thus showing that the entire topology of the network is contained in the entropy functions and its derivatives.

When C is diagonalized, with the values leading to the Markov transformations, or to the more general values of the diagonals of the last paragraph, a diagonalization of the M matrix occurs. The interpretation of the eigenvectors is now totally obvious as those linear combinations of nodal flows that give a single eigenvalue (decrease when the transformation is Markov) of the associated probability, for that eigenvector. This follows from the fact that all Markov eigenvalues are negative except the one value for equilibrium which has eigenvalue unity for equilibrium. That means that each of these negative eigenvalues of C reflect the decreasing exponential rates of decrease of the associated eigenvector as the system approaches equilibrium as $\lambda$ approaches infinity in $M=e^{\lambda C}$. This shows that all of the Renyi entropy values are increasing as the system approaches equilibrium, which is normally the state of all nodes having the same value of this hypothetical probability. The use here of this 'artificial flow of probability under M' provides more than just a method of encapsulating the topology with generalized entropy values, it also provides an intuitive model for the eigenvectors and eigenvalues for C and sheds light on the graph isomerism problem (different topologies having the same eigenvalue spectra). It does not resolve any graph isomerism issue associated with degeneracy of multiple topologies for a single eigenvalue spectra without altering the C matrix by the Abelian transformations.

For networks such as the internet, the appropriate connection matrix can be formed from source and destination information transfers, where both asymmetry and levels of connection are to be maintained in the C(t) matrix values during that window of time about that time instant. Specifically, this means that if a connection is made multiple times in that time interval, then that C element should reflect the appropriate weight of connectivity as this adds substantial value to the entropy functions. At each instant, the column and row entropy spectra can be computed along with the total row and column entropy and that this be done for lower order Renyi entropies as well as lower order values in the expansion of the Markov parameter $\lambda$ that includes higher order connectivity of the topology. These entropy metrics can be used in detecting abnormal changes in topologies that can be associated with attacks, intrusions, malicious processes, and system failures. The patterns of specific topologies such as rings, trees, clusters, and other structures have interesting entropy spectra.

V. Exemplary System

Figure 2:
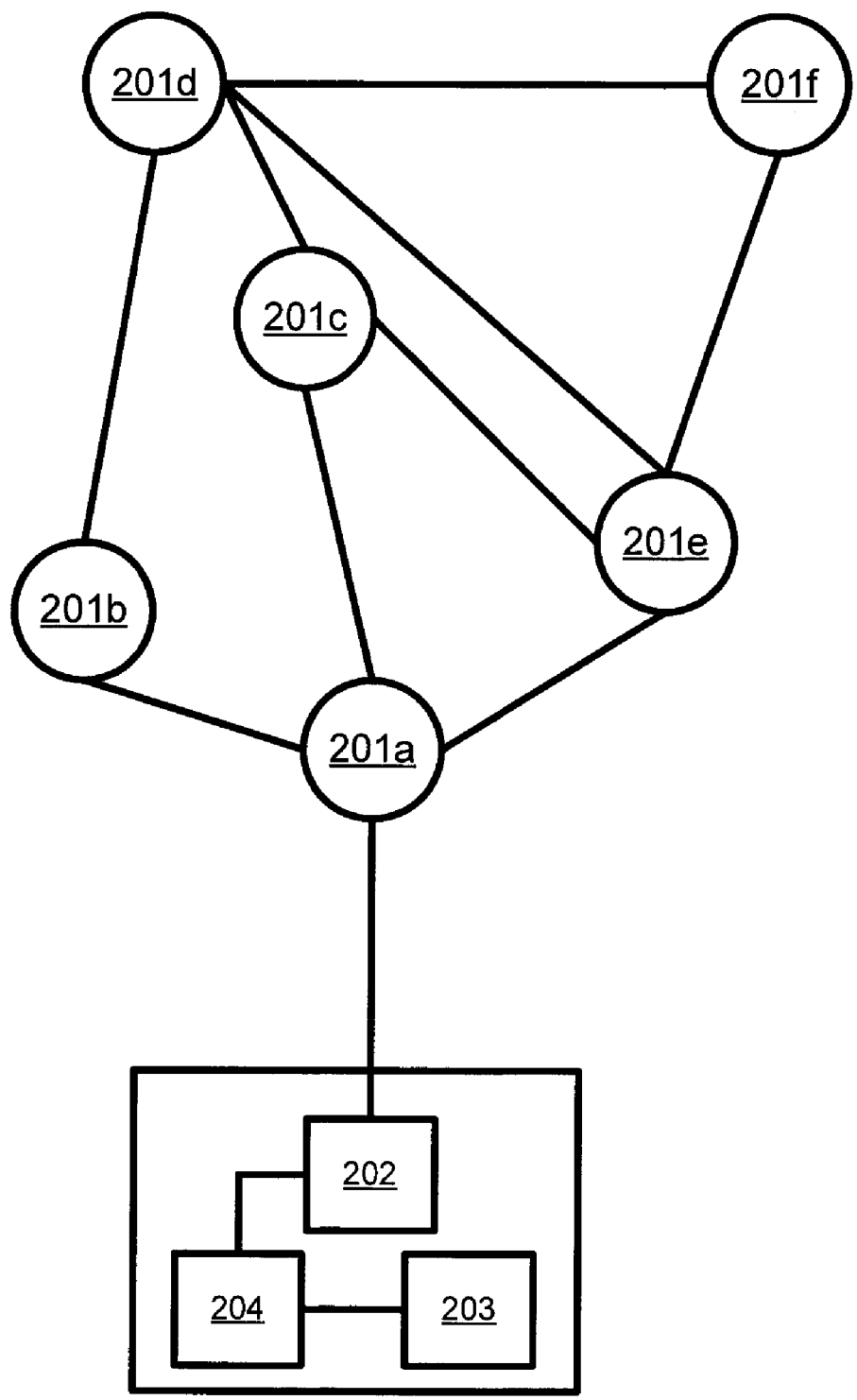
FIG. 2 is an exemplary system.

In one aspect, illustrated in FIG. 2, systems are provided for network analysis comprising at least two network nodes 201a-f, a network interface 202 in communication with the at least two network nodes, a memory 203, one or more processors 204 coupled to the network interface, the processor configured for performing the steps of receiving network data and storing the network data in the memory 203, constructing a C(i, j) matrix, normalizing the C(i, j) matrix, constructing a $M^c$ and $M^r$ matrix, determining the row and column entropy values and plotting a spectral curve base on the entropy value. The processor can be further configured to monitor the spectral curve for a deviation in mean shape. The processor 204 can be configured for performing any method described herein.

Receiving network data can comprise receiving network data and an associated date/time, a node i, a node j, and a weight. A node can be identified by an integer.

Constructing a C(i, j) matrix can comprise defining a matrix C(i, j, t, dt) as the sum of all weights, from node i, to node j, from time t−dt/2 to time t+dt/2 where dt is a window of time that allows the inclusion of a number of weight values, constructing at each instant of time a 'column' $C^c$ matrix wherein the diagonal values are defined as the negative of the sum of all other members of that column, and constructing at each instant of time a 'row' $C^r$ matrix wherein the diagonal values are defined as the negative of the sum of all other values for each row.

Normalizing the C(i, j) matrix can comprise dividing the C(i, j) matrix by a trace. The trace can be the sum of all off diagonal elements of the C(i, j) matrix.

Constructing a $M^c$ and $M^r$ matrix can comprise, for each of the $C^c$ and the $C^r$, constructing an M matrix that is defined by $M=\exp(aC)=I+aC+a^2C^2/2!+\ldots$ Determining an entropy value can comprise for each column $M^c$, computing $I_j(t)=\log_2\{N\,\Sigma_i\,M_{ij}^2\}$ where N is the number of nodes and then sorting the $I_j$ values in descending order.

Plotting a spectral curve base on the entropy value can comprise plotting a column entropy spectra, plotting a row entropy spectra, and determining and plotting higher order Renyi entropies.

Figure 3:
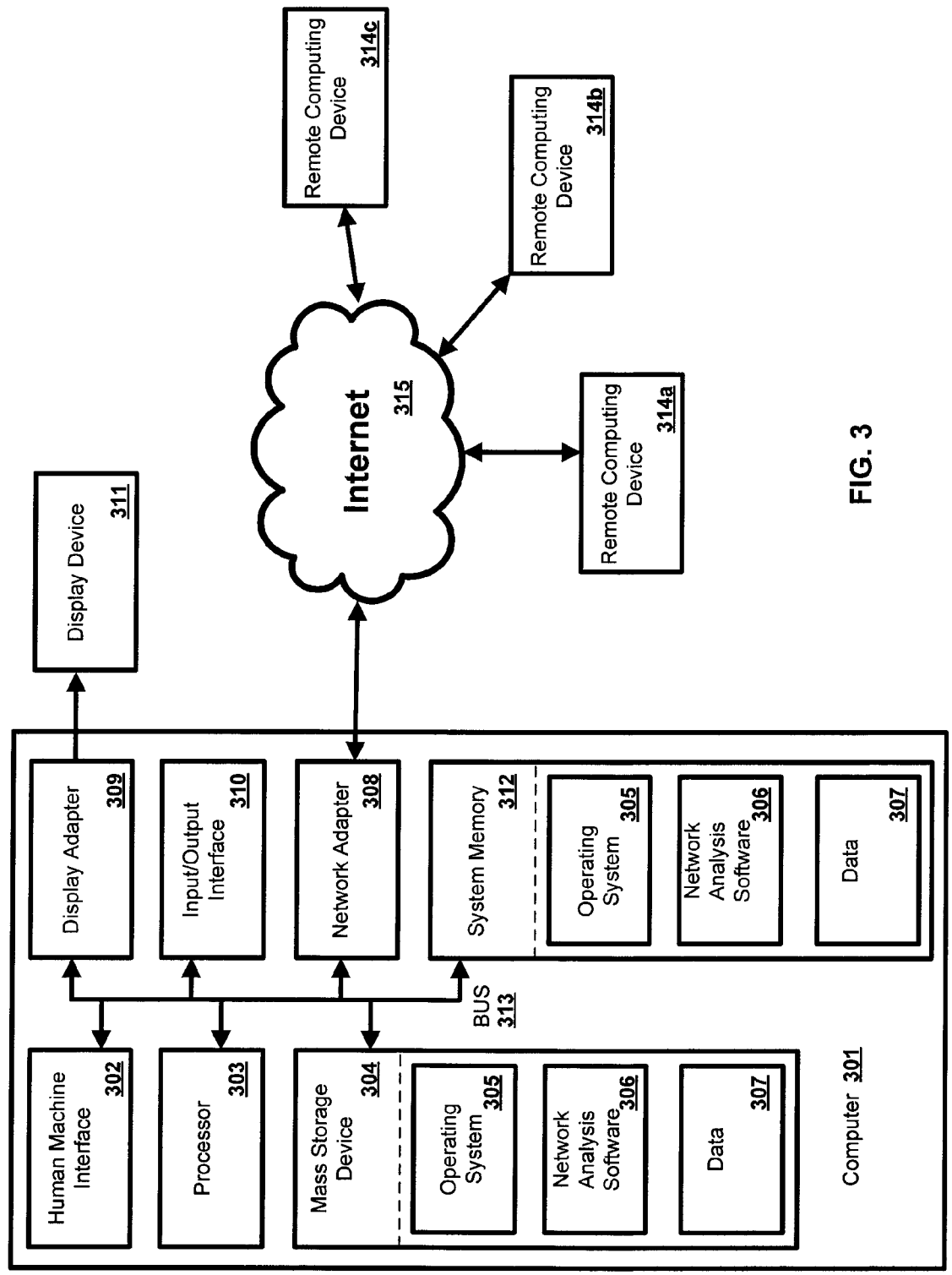
FIG. 3 is an exemplary operating environment.

One skilled in the art will appreciate that the description of the methods and systems provided is a functional description and that respective functions of the methods provided can be performed by software, hardware, or a combination of software and hardware. Functions can comprise the Network Analysis Software 306 as illustrated in FIG. 3 and described below. In one exemplary aspect, functions can comprise a computer 301 as illustrated in FIG. 3 and described below.

FIG. 3 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The system and method of the present invention can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

In another aspect, the system and method of the present invention can be described in the general context of computer instructions, such as program modules, being executed by a computer. Generally, program modules comprise routines, programs, objects, components, data structures, etc. that perform particular tasks or implement particular abstract data types. The system and method of the present invention can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 301. The components of the computer 301 can comprise, but are not limited to, one or more processors or processing units 303, a system memory 312, and a system bus 313 that couples various system components including the processor 303 to the system memory 312.

The system bus 313 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 313, and all buses specified in this description can also be implemented over a wired or wireless network connection and each of the subsystems, including the processor 303, a mass storage device 304, an operating system 305, Network Analysis software 306, data 307, a network adapter 308, system memory 312, an Input/Output Interface 310, a display adapter 309, a display device 311, and a human machine interface 302, can be contained within one or more remote computing devices 314*a,b,c* at physically separate locations, connected through buses of this form, in effect implementing a fully distributed system.

The computer 301 typically comprises a variety of computer readable media. Exemplary readable media can be any available media that is accessible by the computer 301 and comprises, for example and not meant to be limiting, both volatile and non-volatile media, removable and non-removable media. The system memory 312 comprises computer readable media in the form of volatile memory, such as random access memory (RAM), and/or non-volatile memory, such as read only memory (ROM). The system memory 312 typically contains data such as data 307 and/or program modules such as operating system 305 and Network Analysis software 306 that are immediately accessible to and/or are presently operated on by the processing unit 303.

In another aspect, the computer 301 can also comprise other removable/non-removable, volatile/non-volatile computer storage media. By way of example, FIG. 1 illustrates a mass storage device 304 which can provide non-volatile storage of computer code, computer readable instructions, data structures, program modules, and other data for the computer 301. For example and not meant to be limiting, a mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 304, including by way of example, an operating system 305 and Network Analysis software 306. Each of the operating system 305 and Network Analysis software 306 (or some combination thereof) can comprise elements of the programming and the Network Analysis software 306. Data 307 can also be stored on the mass storage device 304. Data 307 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 301 via an input device (not shown). Examples of such input devices comprise, but are not limited to, a keyboard, pointing device (e.g., a "mouse"), a microphone, a joystick, a scanner, and the like. These and other input devices can be connected to the processing unit 303 via a human machine interface 302 that is coupled to the system bus 313, but can be connected by other interface and bus structures, such as a parallel port, game port, an IEEE 1394 Port (also known as a Firewire port), a serial port, or a universal serial bus (USB).

In yet another aspect of the present invention, a display device 311 can also be connected to the system bus 313 via an interface, such as a display adapter 309. It is contemplated that the computer 301 can have more than one display adapter 309 and the computer 301 can have more than one display device 311. For example, a display device can be a monitor, an LCD (Liquid Crystal Display), or a projector. In addition to the display device 311, other output peripheral devices can comprise components such as speakers (not shown) and a printer (not shown) which can be connected to the computer 301 via Input/Output Interface 310.

The computer 301 can operate in a networked environment using logical connections to one or more remote computing devices 314*a,b,c*. By way of example, a remote computing device can be a personal computer, portable computer, a server, a router, a network computer, a peer device or other common network node, and so on. Logical connections between the computer 301 and a remote computing device 314*a,b,c* can be made via a local area network (LAN) and a general wide area network (WAN). Such network connections can be through a network adapter 308. A network adapter 308 can be implemented in both wired and wireless environments. Such networking environments are conventional and commonplace in offices, enterprise-wide computer networks, intranets, and the Internet 315.

For purposes of illustration, application programs and other executable program components such as the operating system 305 are illustrated herein as discrete blocks, although it is recognized that such programs and components reside at various times in different storage components of the computing device 301, and are executed by the data processor(s) of the computer. An implementation of Network Analysis software 306 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Applicable networks include, but are not limited to, communication networks such as the Internet, phone (wired & wireless), mail, Fed-Ex, UPS, transportation networks such as air traffic, highways, waterway, railroads, and pipelines, financial networks such as banking & fund transfers, accounting flows, ownership & investments, input-output, economic flows, utility & energy networks such as electrical power grids, electrical circuits & devices, water & sewer flows, natural gas distribution, biological networks such as disease, metabolic processes, and neural networks, social networks such as criminal and terrorist networks, organizational charts and relationships, social organizations, financial-social alliances, and cooperative links, manufacturing processes such as tracking of just-in-time flows for manufacturing and work flows, and assembly line flows, and electrical & mechanical networks such as all electrical devices with electrical flows, all computers and collections of computers, and mechanical systems with energy flows among components.

VI. Exemplary Method

Figure 4:
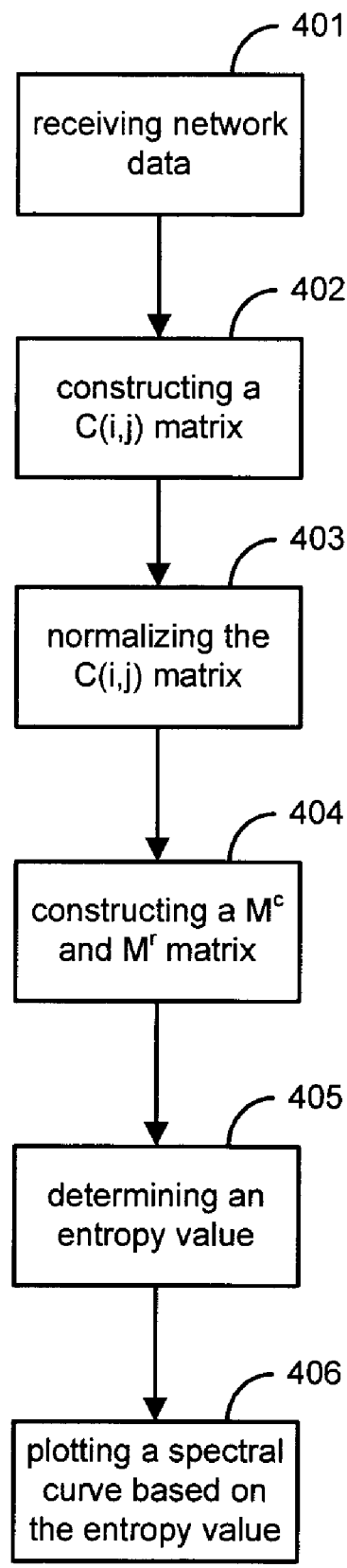
FIG. 4 is a flowchart depicting an exemplary method.

In one aspect, described in FIG. 4, methods are provided for network analysis comprising receiving network data at block 401, constructing a C(i, j) matrix at block 402, normalizing the C(i, j) matrix at block 403, constructing a $M^c$ and $M^r$ matrix at block 404, determining entropy values at block 405, and plotting a spectral curve based on the entropy values at block 406. The method can further comprise monitoring the spectral curve for a deviation in mean shape. 'Abnormal' is manifest in the deviation of the curve from its mean shape, section by section, (for that time of day, day of week, month of year, etc thus removing known and expected variational behaviors). The probability that a set of nodes is involved in an attack, malicious process, abnormal behavior, system malfunction, etc can be, in lowest order approximation, proportional to the probability that those nodes will deviate by that fraction of the observed standard deviation for that region of the curve. It is thus possible to identify nodes that are most probably involved in abnormal behavior. There are many statistical and mathematical techniques for investigating these functions. A monitoring display and method is provided that can display the column and row entropy functions over time showing, by color or other visual indicator, which nodes deviated from their normal range with what probability (appropriately corrected for time of day, day of week, and other known periodicities).

The spectral form can be studied by multiple means to see to what degree it deviates from the 'normal profile' for that time and for that network and type. Specifically, the sum of the squares deviation can be tracked between the instantaneous row spectral curve and the 'normal' spectral curve. This reduces the entire network at a given time, to a single value representing the difference from the normal state of that network. There are many statistical methods available to compare the current to the normal entropy spectra Receiving network data can comprise receiving network data and an associated date/time, a node i, a node j, and a weight. A node can be identified by an integer. A network data monitoring program, such as SNORT or similar programs, can be used to create a database of data transmissions. The database can comprise t, i, j, w=date-time, node i, node j, weight where the time is a time of transmission from node i (one IP address) to another node j (a second IP address). The 'weight', w, can be a non-negative real number that represents the extent or 'amount' of connection. For example, it can be the number of bits transmitted for a certain type of transmission or it can be a '1' if a transmission occurs. Integers can be used to 'renumber' the identity of the nodes rather than the values of node IP address, but an integer-IP address mapping table can be created to later allow identification of problematic nodes.

Constructing a C(i, j) matrix can comprise defining a matrix C(I, j, t, dt) as the sum of all weights, from node i, to node j, from time t−dt/2 to time t+dt/2 where dt is a window of time that allows the inclusion of a number of weight values, constructing, at each instant of time, a 'column' $C^c$ matrix wherein the diagonal values are defined as the negative of the sum of all other members of that column, and constructing, at each instant of time, a 'row' $C^r$ matrix wherein the diagonal values are defined as the negative of the sum of all other values for each row. The diagonals can have value zero at this point. The 'column' $C^c$ matrix can be such that the diagonal values are defined as the negative of the sum of all other members of that column. The 'row' $C^r$ matrix can be such that the diagonal values are defined as the negative of the sum of all other values for each row. The weight values can be added to provide more detailed and sensitive entropy metric. The asymmetry of the C matrix can be maintained to indicate anomalies in itself (such as scans and broadcasts).

Normalizing the C(i, j) matrix can comprise dividing the C(i, j) matrix by a trace. The trace can be the sum of all off diagonal elements of the C(i, j) matrix. In order to standardize the 'size' of the C matrix, it can be divided by the (negative of) trace which is an invariant. The trace can be the sum of the diagonal terms which are the negatives of the sum of element in the respective columns. Thus the trace can become the sum of all off diagonal elements of the C matrix (and equivalently the negative of the sum of the diagonal elements). The different time windows for summing the matrix and the different methods of assessing weights to the individual transmissions between the nodes, can lead to matrices of vastly different sizes. The expansion of the M matrix can ensure that the expansion parameter a can give M matrices that have positive values everywhere and yet not have negligible values (when a is too small). The normalization of C can provide for standardization.

Constructing a $M^c$ and $M^r$ matrix can comprise, for each of the $C^c$ and the $C^r$, constructing an M matrix that is defined by $M=\exp(aC)=I+aC+a^2C^2/2!+\ldots$ (i.e. one matrix $M^c$ for the $C^c$ and one matrix $M^r$ for the $C^r$). Here the 'a' is a real positive number that gives the 'extent of the expansion'. An infinite number of terms cannot be computed, but for large matrices the series can be truncated with 1, 2, or 3 terms. Thus the lowest order M matrix is the same as an 'aC' matrix but with different diagonals. The number of terms that is kept can be dependent upon the size of the matrix being tracked and thus the computational time available and the richness of the topology being explored (ie the powers of C). The expansion parameter value 'a' can be selected such that the resulting truncation gives no negative terms for M yet is large enough so that 'higher order connectivity' terms are included. For example, it might be taken as ½ of the maximum negative number in the computation of M to that order.

Every power of C will have the sum of each column equal to zero (which follows from the fact that C itself has the sum of each column equal to zero). This is true for both the row and column C matrices. It is also true that the full expansion of $M=\exp(aC)$ will always give matrix elements which are all positive. But in practice, the series is truncated and although each column (and row) has a sum of unity, some terms may be negative unless the parameter 'a' is chosen to be sufficiently small. All values must be positive in order that the columns (or rows) can be interpreted as a probability distribution for the computation of entropy on that distribution.

Determining an entropy value can comprise for each column $M^c$, computing $I_j(t)=\log_2\{N \Sigma_i M_{ij}^2\}$ where N is the number of nodes and sorting the $I_j$ values in descending order. The original correspondence numbering can be retained to enable identification of which node is which. The C matrix provides a time evolving family of Markov conserved flows corresponding exactly to the topology. Thus the entropy function of the corresponding column (transform away from) for that node encapsulates the order/disorder of that nodes topology. The entire spectra capture the order and disorder for the entire network Plotting a spectral curve base on the entropy value can comprise plotting a column entropy spectra (the resulting function will be non-increasing but may have flat places representing nodes that have identical entropy values), plotting a row entropy spectra (the same new order can be used for the rows), and determining and plotting higher order Renyi entropies (powers of the M components that are squared above). If a set of nodes have the same column entropy but different row entropy, then they can be resorted by the order of their row values in descending order.

In another aspect, provided is a method for network analysis comprising using a data stream of Time, Node i, Node j, and weight of connection, time windows are blocked out and a C matrix is built for each window at time t, fixing the diagonals for Markov generation, normalizing the C matrix to unit trace (the original trace is stored as an intensity), adjusting the $\lambda$ parameter in the expansion to determine a given distance in interconnectivity. Determining an M matrix to a given order of expansion of the power of C (dependent upon $\lambda$). The entropy can be computed for each column of M and the entropies sorted in order to obtain a spectral curve (as it does not matter which node does what but only seek abnormalities).

For a given network, data can be accumulated to assess what is a 'normal' distribution (usually corrected for that date & time of day and perhaps for weather and other variables). The difference in the normal (average) entropy spectral can be displayed and analyzed. Those nodes that differ substantially can be instantly traced even though the spectra is sorted (if a look-up table of nodes is maintained).

A method for summarizing the information comprises computing the sums of squares of deviations and plot this over time seeking anomalies. The same procedure can be executed for rows as for the columns thus locating asymmetric anomalies. A network can be represented at a given instant by a pair of spectral curves representing the incoming and outgoing entropy (order/disorder) metrics. These metrics can be shown to have the interpretation the entropy rates of the dispersion of a conserved entity (fluid) over the equivalent network topology, with the flow rates specified.

In this framework, the meaning of the eigenvectors and eigenvalues of the connection matrix can be understood. The pattern for the network can be tracked to see what is its normal entropy distribution for that date and time and conditions (such as weather). Then the two entropy spectra can be subtracted from this distribution and the sum of squares of deviations computed to give two values as a function of time. When these two values go to abnormal ranges, it is possible to drill back to determine which exact nodes caused (or are causing) the anomalies.

Further contemplated are various adjustments of the parameter s and associated choice of the number of terms (of the C matrix) used in computing the expansion of the M matrix, the adjustments of the window of time for inclusion of processes as well as the advancement of the time increment by adjustable means, the exact choice of the order of the Renyi entropy where only the second order was used(i.e. power of the probability in the log function), the ratios and differences of these entropy values and specifically these differences from the normal ranges, the condensation of the entropy curves by using known expansions in terms of useful, specifically orthogonal functions, and expressly wavelet expansions which reduce the curves to a smaller number of numerical values which can be tracked for variance, and the monitoring of each of the above items by visual representations to provide graphical input for user monitoring and tracking of changes over time.

The present invention can take advantage of the realization that a Lie Algebra Markov monoid is isomorphic to Networks (when diagonals are fixed) and that a Lie Group monoid gives probability distributions for flows of conserved entity. The C matrix can be normalized to give trace=−1 and stored as amplitude A(t). Expansion can be performed to any order of expansion level to feel out connectivity. A generalized entropy of order k can be computed on each Markov column. Diagonals can be also fixed for Markov row probabilities (but same A(t)). Entropies for rows can be determined and entropies for rows can be sorted in the same order as for columns to remove degeneracy. The normal behavior for row and column entropy spectra can be determined. The normal behavior can be adjusted for time of day, day of week/month, weather, and the like.

The sum of squares of deviation of both row and column entropies from normal plot can be determined. The norm of C gives the trace of C which is the amplitude of the network activity. This norm can be also corrected for date and time, weather, and the like.

Figure 5:
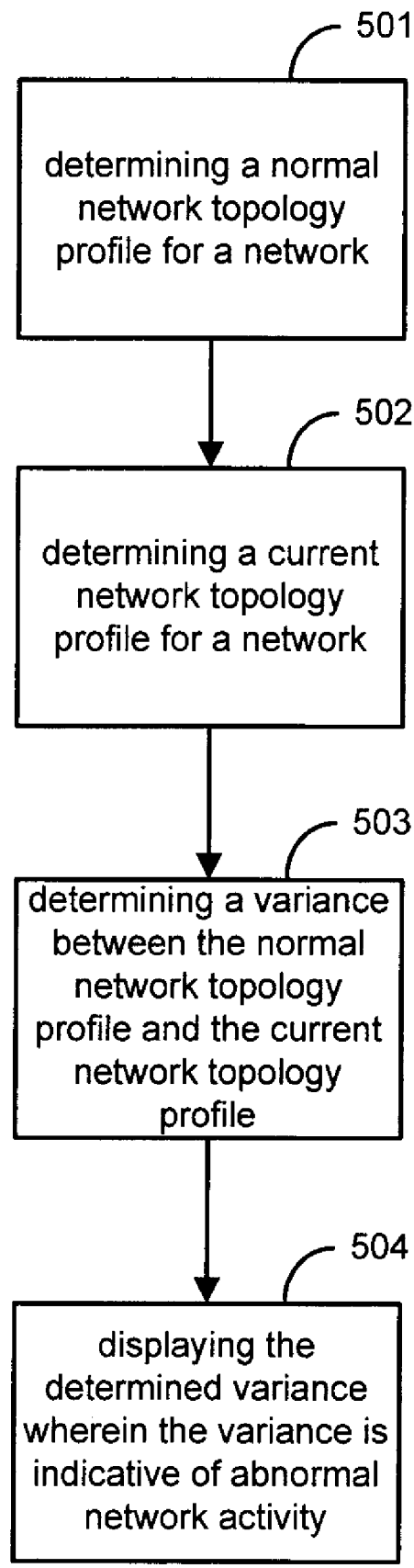
FIG. 5 is a flowchart depicting an exemplary method.

In another aspect, illustrated in FIG. 5, methods are provided for network monitoring comprising determining a normal network topology profile for a network based on entropy spectra at block 501, determining a current network topology profile for a network based on entropy spectra at block 502, determining a variance between the normal network topology profile and the current network topology profile at block 503, and displaying the determined variance wherein the variance is indicative of abnormal network activity at block 504. The methods can further comprise determining a normal and current network topology profile for incoming network activity, determining a normal and current network topology profile for outgoing network activity, or both. The methods can further comprise determining total amplitude of network flows, determining a percentage of nodes participating in network flows, or both.

The methods can further comprise determining an abnormal deviation in the current network profile relative to the normal network profile. Determining an abnormal deviation can comprise determining a normal entropy spectra and a current entropy spectra for each participating node of a network and determining which node (or nodes) has a current entropy spectra that differs from the normal entropy spectra.

Figure 6:
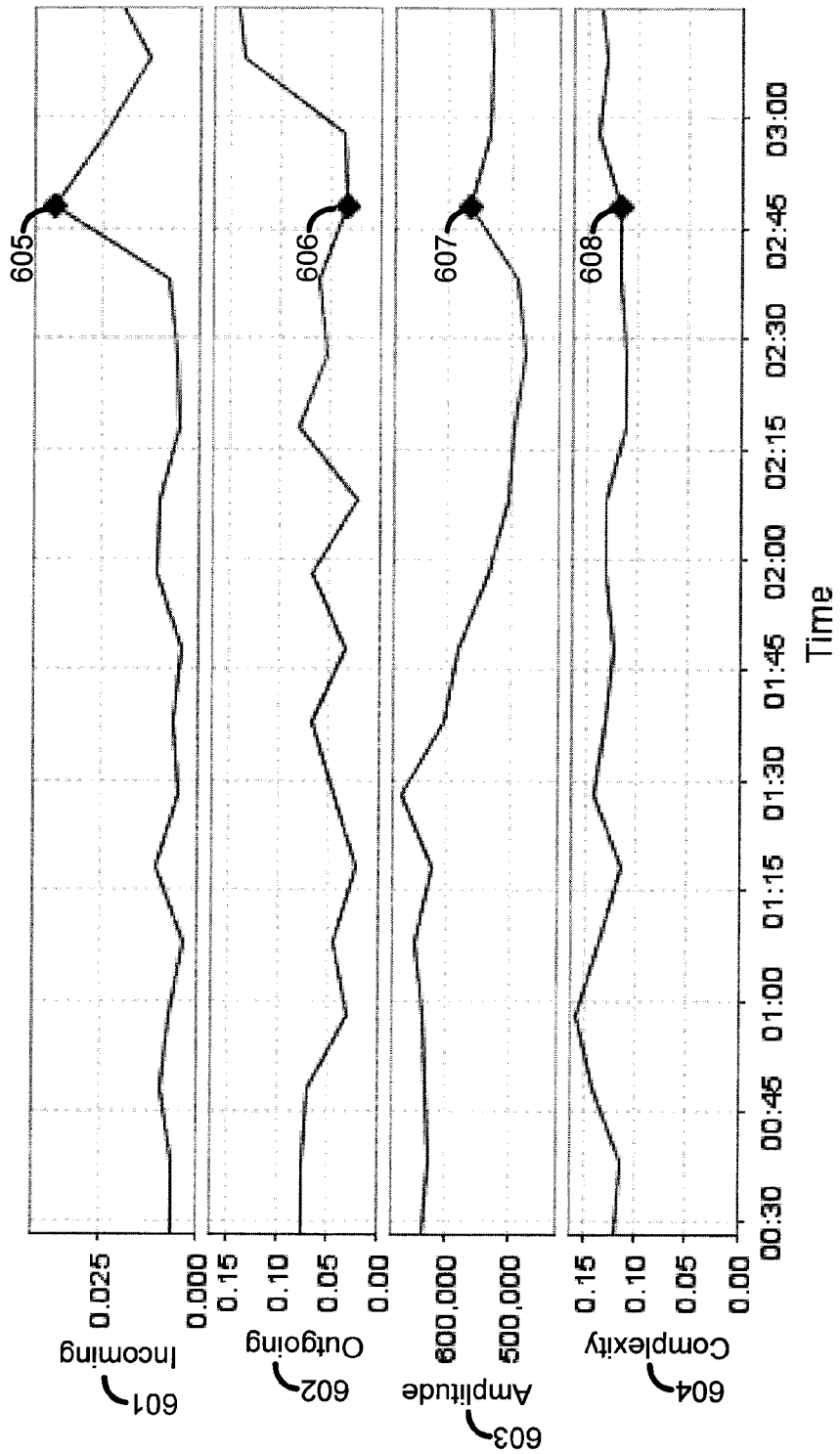
FIG. 6 is an exemplary display indicating network status.

FIG. 6 illustrates an exemplary display illustrating an embodiment of a tangible effect of the present methods.

The "Incoming" graph 601 shows at each point in time, the total variance (sum of squares of differences) between a normal incoming network entropy profile and a current incoming network entropy profile at the listed instance in time. The variance displayed can be computed, for example, by taking the sum of squares of differences between the normal and current profiles illustrated graphically as plot 701 in FIG. 7.

The "Outgoing" graph 602 is the same computation but shows the total variance between a normal outgoing network entropy profile and a current outgoing network entropy profile at the listed instant in time. The variance displayed can be computed, for example, by taking the sum of squares of differences between the normal and current profiles illustrated graphically as plot 702 in FIG. 7.

The "Amplitude" graph 603 shows the total amplitude of the flows in the network as a function of time. It is similar to the total number of stocks traded on the stock exchange whereas the Incoming and Outgoing graphs indicate the entropy (or information) spectral profile would be similar to the inflows of money or outflows of money topologically.

The "Complexity" graph 604 shows the complexity by which is meant the percentage of nodes that are participating in the flows at each instant of time.

The points 605-608 indicate an abnormal deviation in entropy traffic relative to the normal. Thus that instant of time can be viewed in depth to see what is happening.

Figure 7:
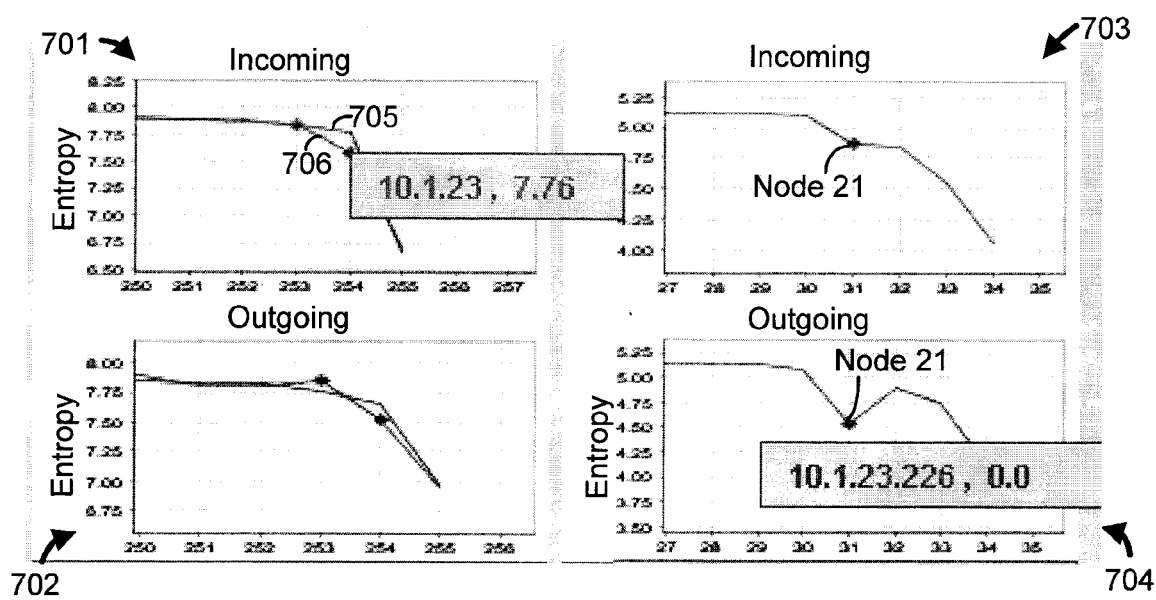
FIG. 7 is an exemplary display indicating network status.

FIG. 7 illustrates the network at that instant of time represented by the points 605-608.

Plot 701 shows the sorted entropy spectra verses the nodes that are participating. The curve 705 is the normal curve (averaged over a long time) giving the amount of entropy verses the specific node. The curve 706 is the amount of entropy verses the specific node at the time in question. It can be determined which nodes differ, for example, a server section that begins with the IP address 10.1.23.

It is possible to further "drill down" into that part of the network to view the network that is under that IP address heading. For example, the deviate part of a big network might indicate that a server in a particular division is behaving in an anomalous way. A "subnetwork" can be viewed that is shown in incoming plot 703 and outgoing plot 704. Here it can be determined that node 21 in that subnetwork has an abnormal behavior pattern as indicated by the abrupt change in both incoming entropy flows and outgoing entropy flows for that node.

In an exemplary display, a user can click on spikes of deviation (or automate) to open a window showing deviate nodes. Eigenvalues and eigenvectors can give collections of pure exponential decreases (normal expansions of entropy functions $I=\log_2 N<x(t)|x(t)>=\ldots$ and its derivatives). Ordering by rows then by columns can provide an almost unique order for network comparison. Entropies can be used to type & identify different topologies—clusters, trees, and the like. Diagonal changes to the C matrix can be done by birth/death feeds at nodes—Abelian by removing the diagonals each time prior to multiplication (and storing) gives non-repeating paths which can be exponentiated. The eigenvalues of the C matrix (equivalently the M matrix) have the interpretation of the rates of approach to equilibrium of a conserved fluid (probability)—like normal modes of vibration. The eigenvectors are those linear combinations of nodes, for that topology of flows, that have simple exponential decays to maximum entropy equilibrium The $2(N-1)$ row and column entropies can be computed on all the sub-matrices of C and this should give all the data in C. The use of different time windows to compute C gives different results Different factors of the expansion parameter $\lambda$ can be used. The use of different orders of expansion of the powers of the C matrix computing M. The use of the eigenvalues and eigenvectors of C (or equivalently M) to label topologies. The use of separate and combined entropy ordering of nodes to have a unique node label number. User adjustable linear combination of multiple networks $C=a_1C_1+a_2C_2+\ldots a_nC_n$. Loader and capture programs with renumbering of nodes by 1, 2, 3, . . . with lookup table can be used. The definition of the sum of all column (and separately the row) entropies can be used to obtain one entropy number representing the transfers to (and separately from) the nodes.

VII. EXAMPLE

The following example is put forth so as to provide those of ordinary skill in the art with a complete disclosure and description of how the devices and methods claimed herein are made and evaluated, and are intended to be purely exemplary of the invention and are not intended to limit the scope of what the inventor regards as the invention. Efforts have been made to ensure accuracy with respect to numbers (e.g., amounts, etc.), but some errors and deviations should be accounted for.

The computational techniques defined above along with the associated Markov entropy network metrics can be used to analyze the static and track the dynamic behavior of any type of network structure. Network tracking has been performed on internet traffic as defined by Snort data capture at servers of information that is sent from one IP address to another IP address. The objective was to identify anomalies, and abnormal behavior relative to normal traffic patterns by monitoring the total column (incoming traffic) and row (outgoing traffic) second order Renyi' entropy along with the traffic volume (which is independent of the traffic topology). This is similar to separating the buying pattern of financial investments from the volume of transactions on the market as two separate indicators.

Figure 8:
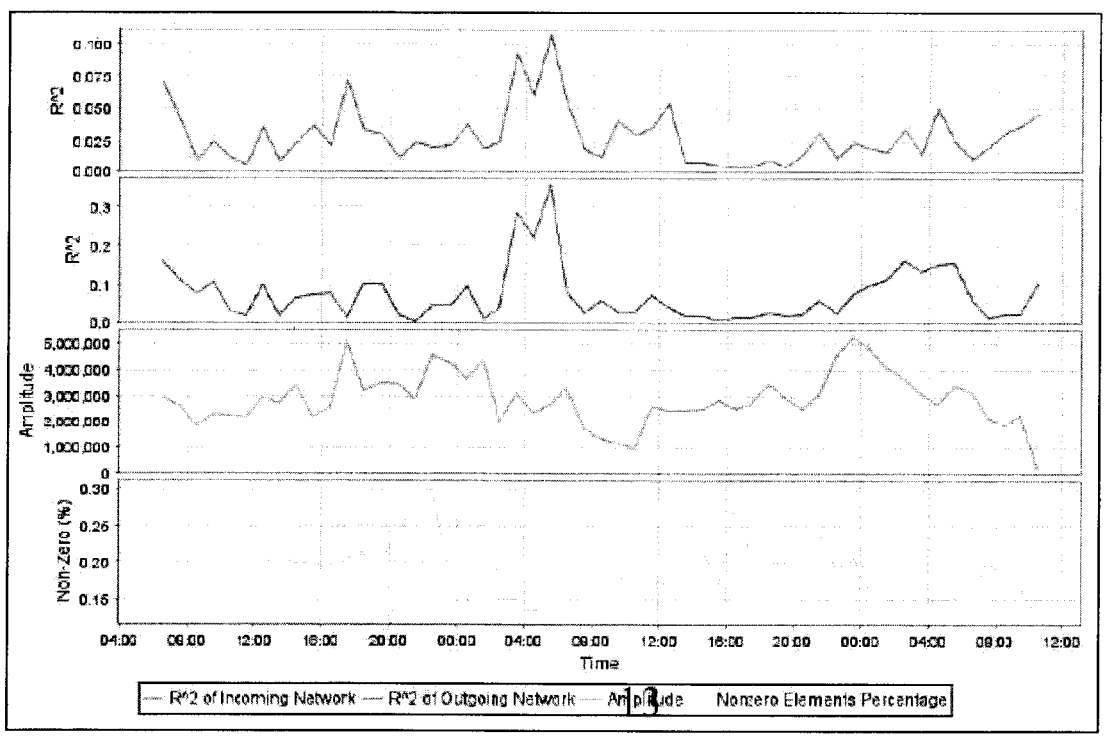
FIG. 8 is an exemplary display indicating network status.
Figure 9:
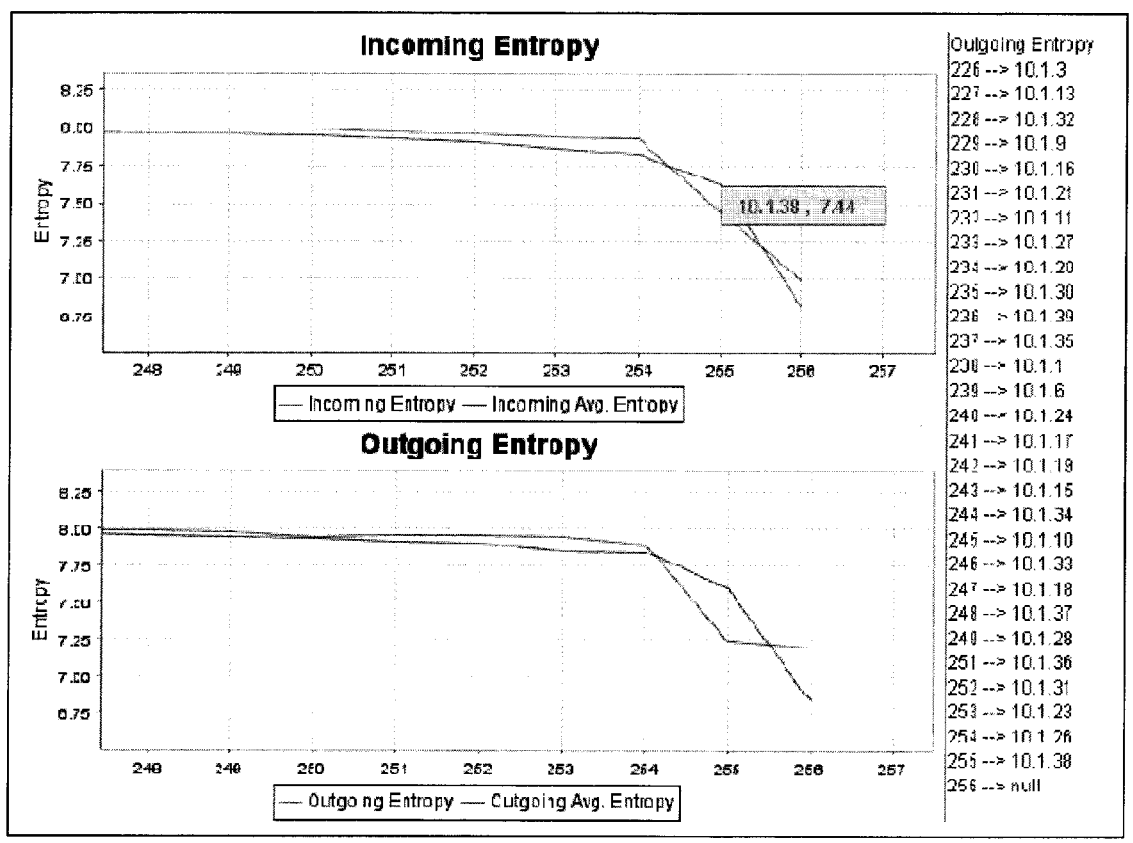
FIG. 9 is an exemplary display indicating network status.

The graph provided in FIG. 8 shows the total incoming and outgoing entropy as a function of time for a server at a university of 30,000 students and faculty. The major anomalies were identified at certain times and these were expanded as seen in FIG. 9 to see the full entropy spectra at those times over the network thus identifying the specific nodes that had aberrant behavior. It was determined that these particular anomalies in entropy occurred for nodes that at certain times were used to upload and download large volumes of audio and video files.

The methods and systems of the present invention can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The processing of the disclosed system and method of the present invention can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for network monitoring, the method comprising:
   determining a normal network topology profile for a network based on normal entropy spectra, the normal entropy spectra comprising a first entropy value for each one of a plurality of nodes in the network, wherein the first entropy value depends at least on a first family of Markov flows associated with a topology of the network;
   determining a current network topology profile for a network based on current entropy spectra, the current entropy spectra comprising a second entropy value for each one of the plurality of nodes in the network, wherein the second entropy value depends at least on a second family of Markov flows associated with the topology of the network;
   determining a variance between the normal network topology profile and the current network topology profile; and
   displaying the determined variance wherein the variance is indicative of abnormal network activity.

2. The method of claim 1 further comprising:
   determining a normal network topology profile and current network topology profile for incoming network activity, and
   determining a normal and current network topology profile for outgoing network activity.

3. The method of claim 2, wherein the network is at least one of:
   a communication network;
   a transportation network;
   a financial network;
   a utility network;
   an energy network;
   a biological network.
   a social network;
   a manufacturing process;
   an electrical network; or
   a mechanical network.

4. The method of claim 1 further comprising determining a total amplitude of network flows.

5. The method of claim 1 further comprising determining a percentage of nodes participating in network flows.

6. The method of claim 1 further comprising determining an abnormal deviation in the current network profile relative to the normal network profile.

7. The method of claim 6, wherein the step of determining an abnormal deviation further comprises:
   determining a normal entropy spectra and a current entropy spectra for each participating node of a network; and
   determining a participating node having a current entropy spectra that differs from the normal entropy spectra.

* * * * *